United States Patent
Yang et al.

(10) Patent No.: US 10,303,479 B2
(45) Date of Patent: May 28, 2019

(54) EFFICIENT RANDOM NUMBER GENERATION FOR UPDATE EVENTS IN MULTI-BANK CONDITIONAL BRANCH PREDICTOR

(71) Applicant: VIA ALLIANCE SEMICONDUCTOR CO., LTD., Shanghai (CN)

(72) Inventors: Mengchen Yang, Shanghai (CN); Guohua Chen, Shanghai (CN); Xiaoling Wang, Shanghai (CN)

(73) Assignee: VIA ALLIANCE SEMICONDUCTOR CO., LTD, Shanghai (CN)

( * ) Notice: Subject to any disclaimer, the term of this patent is extended or adjusted under 35 U.S.C. 154(b) by 428 days.

(21) Appl. No.: 15/364,257

(22) Filed: Nov. 30, 2016

(65) Prior Publication Data

US 2018/0136937 A1    May 17, 2018

(30) Foreign Application Priority Data

Nov. 17, 2016    (CN) .......................... 2016 1 1013466

(51) Int. Cl.
| | | |
|---|---|---|
| *G06F 9/30* | (2018.01) | |
| *G06F 9/38* | (2018.01) | |
| *G06F 7/58* | (2006.01) | |

(52) U.S. Cl.
CPC .............. *G06F 9/3806* (2013.01); *G06F 7/58* (2013.01); *G06F 7/588* (2013.01); *G06F 9/3001* (2013.01);
(Continued)

(58) Field of Classification Search
None
See application file for complete search history.

(56) References Cited

U.S. PATENT DOCUMENTS

| 2002/0128794 A1* | 9/2002 | Miyazaki ............... G11C 29/16 702/117 |
| 2008/0263341 A1* | 10/2008 | Ozer ....................... G06F 9/383 712/239 |

(Continued)

FOREIGN PATENT DOCUMENTS

EP    3324287 A1 *    5/2018    ........... G06F 9/3806

OTHER PUBLICATIONS

Michaud, Pierre. "A PPM-Like, Tag-Based Branch Predictor." *A Journal of Instruction-Level Parallelism* 7 (2005) pp. 1-10. Submitted Jan. 2005; published Apr. 2005.

(Continued)

*Primary Examiner* — William B Partridge
(74) *Attorney, Agent, or Firm* — McClure, Qualey & Rodack, LLP

(57) ABSTRACT

A branch predictor, has a plurality of memory banks having entries that hold prediction information used to predict a direction of branch instructions fetched and executed by a processor that comprises the branch predictor. A count of events that occur in the processor is provided to hardware logic that performs an arithmetic and/or logical operation, e.g., XOR, on predetermined bits of the count to generate a random value. In response to the processor determining a correct direction of a branch instruction predicted by the branch predictor, the branch predictor uses the random value generated by the hardware logic to make a decision about updating the memory banks. Bits of a branch history pattern, along with the count, may also be used to generate the random value. The event counted may be a retire of an instruction or a cycle of a core or bus clock.

15 Claims, 5 Drawing Sheets

(52) U.S. Cl.
CPC ........ *G06F 9/30029* (2013.01); *G06F 9/3848* (2013.01)

(56) References Cited

U.S. PATENT DOCUMENTS

| | | | | |
|---|---|---|---|---|
| 2012/0072705 | A1* | 3/2012 | Frazier | G06F 9/30123 712/233 |
| 2012/0072707 | A1* | 3/2012 | Arndt | G06F 9/3004 712/234 |
| 2016/0306632 | A1* | 10/2016 | Bouzguarrou | G06F 9/3848 |

OTHER PUBLICATIONS

Michaud, Pierre. "Five poTAGEs and a COLT for an Unrealistic Predictor." *4th JILP Workshop on Computer Architecture Competitions (JWAC-4); Championship Branch Prediction (CBP-4)*, Jun. 2014. pp. 1-4.

Seznec, André. "The O-GEHL Branch Predictor." IRISA/INRIA/HIPEAC. vol. 7. Apr. 2005. pp. 1-4.

Seznec, André. "A 256 Kbits L-TAGE Branch Predictor." IRISA/INRIA/HIPEAC. 2006. pp. 1-6.

Seznec, André. "A 64 Kbytes ISL-TAGE Branch Predictor." INRIA/IRISA May 20, 2011. pp. 1-4.

Seznec, André. "TAGE-SC-L Branch Predictors." INRIA/IRISA *JILP—Championship Branch Prediction*. Jun. 2014. Proceedings of the 4th Championship Branch Prediction, Minneapolis, MN. pp. 1-8.

Seznec, André. "A Case for (Partially) TAgged GEometric History Length Branch Prediction." AI Access Foundation and Morgan Kaufmann Publishers. 2006. pp. 1-23.

Seznec, André. "The L-TAGE Branch Predictor." IRISA/INRIA/HIPEAC *Journal of Instruction-Level Parallelism* vol. 9. Submitted Apr. 2007; Published May 2007. pp. 1-13.

Miftakhutdinov, Rustam. "Why TAGE is the Best." Downloaded Jun. 21, 2016 at https://comparch.net/2013/06/30/why-tage-is-the-best/ pp. 1-3.

* cited by examiner

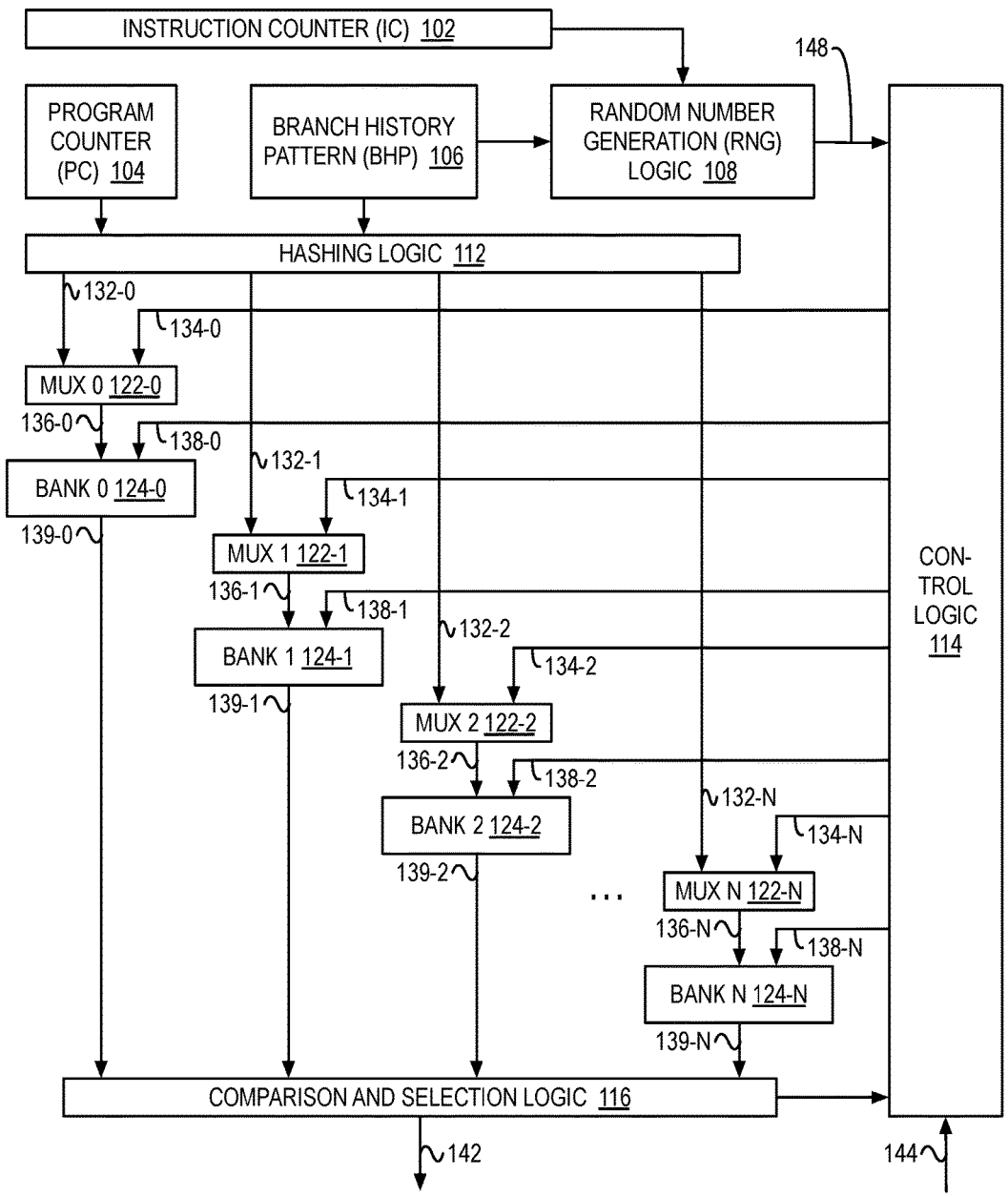

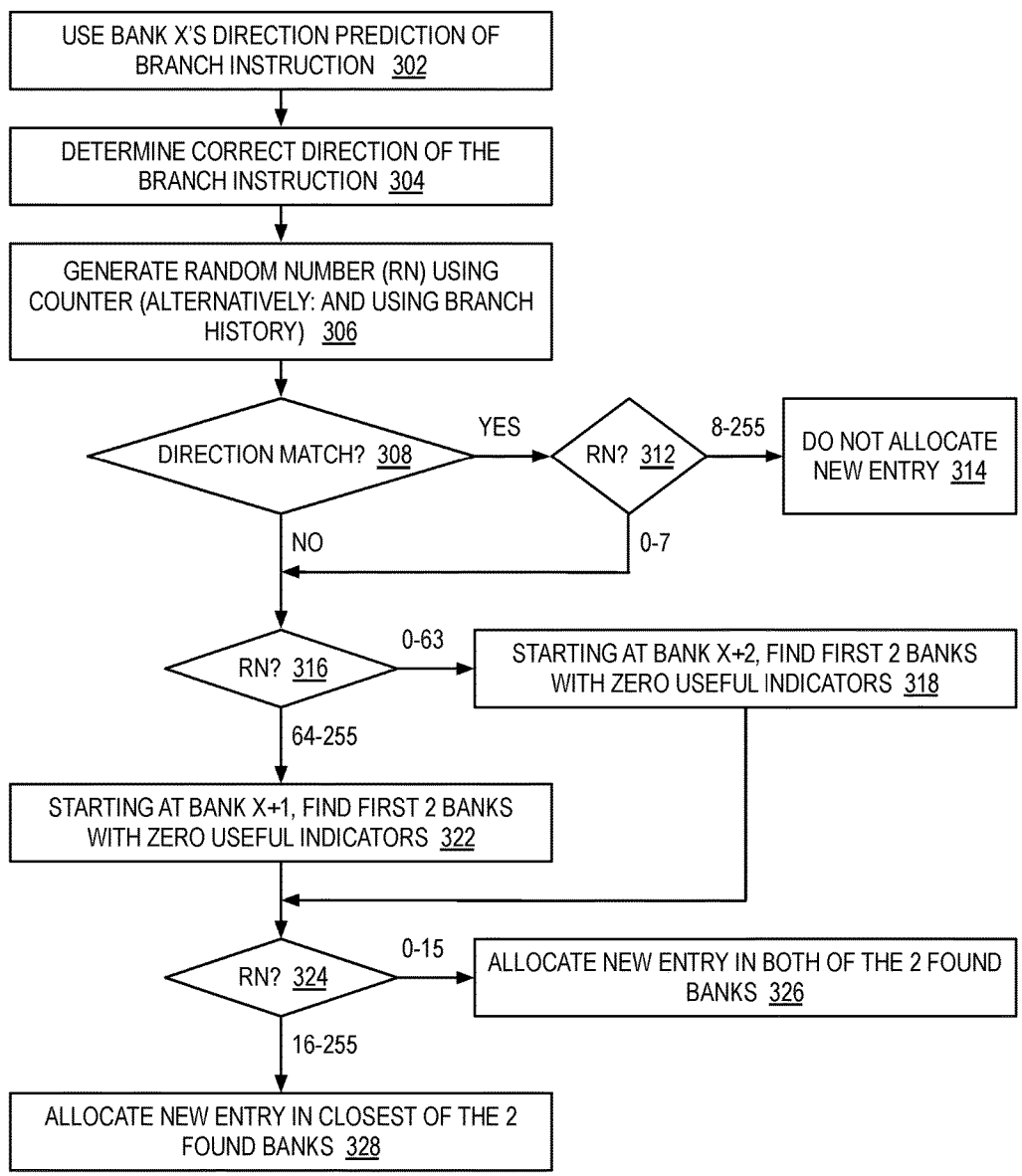

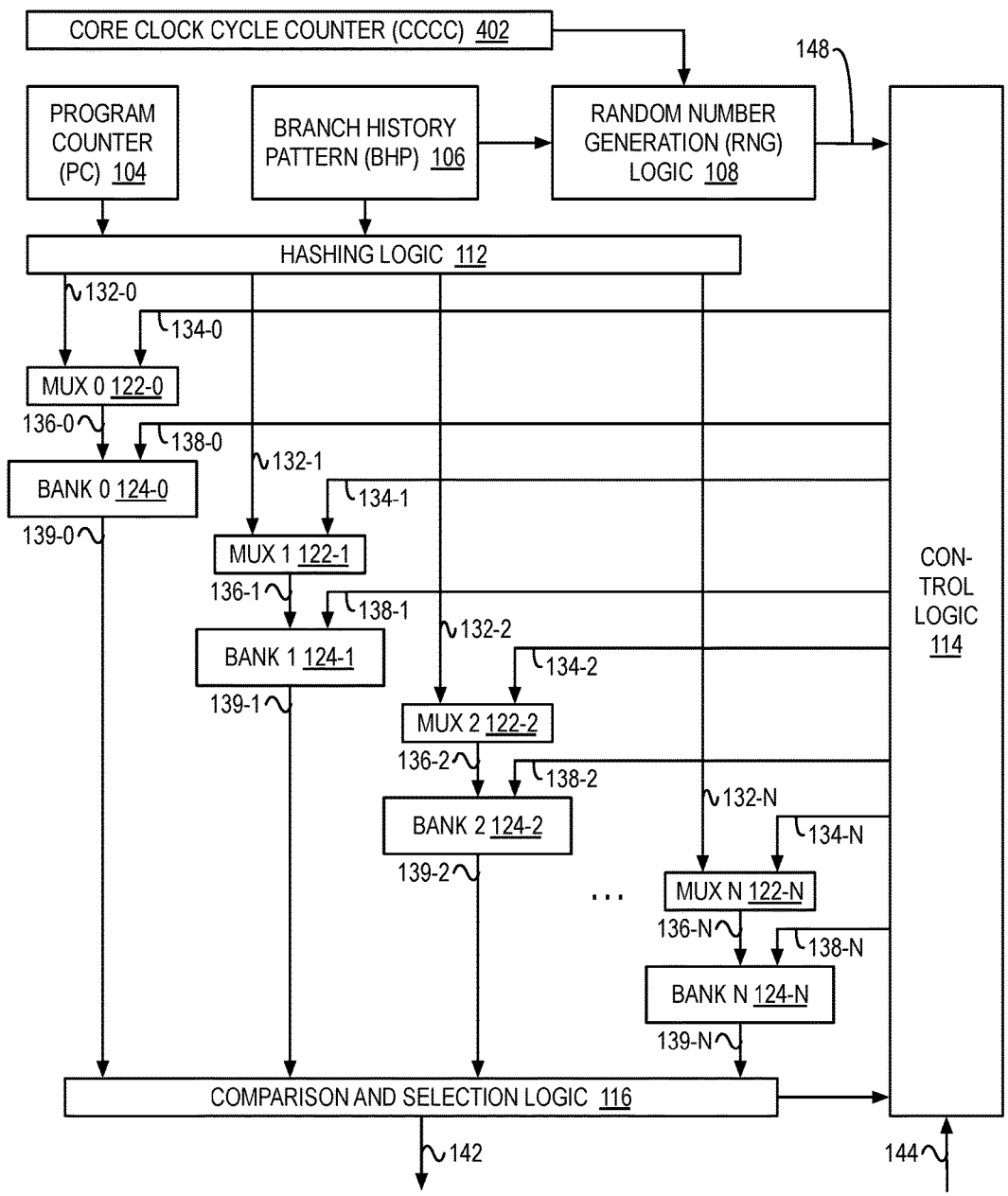

EFFICIENT RANDOM NUMBER GENERATION FOR UPDATE EVENTS IN MULTI-BANK CONDITIONAL BRANCH PREDICTOR

CROSS REFERENCE TO RELATED APPLICATION(S)

This application claims priority to China Application No. 201611013466.0, filed Nov. 17, 2016, which is hereby incorporated by reference in its entirety.

BACKGROUND

The need for increased prediction accuracy of branch instructions is well-known if the art of processor design. The need has grown even greater with the increase of processor pipeline lengths, cache memory latencies, and superscalar instruction issue widths. Branch instruction prediction involves predicting the target address and, in the case of a conditional branch instruction, the direction, i.e., taken or not taken.

One popular conditional branch instruction direction predictor is commonly referred to as a TAGE predictor, which is an acronym for TAgged GEometric length predictor, which has been described in various papers authored by Andre Seznec. The TAGE predictor include multiple memory banks used to store branch prediction information. Each bank of the predictor is indexed with a hash of the program counter and a length of the branch history pattern except one default bank that is indexed by only the program counter. To generate the index for each of the non-default banks, a different length of the branch history pattern is hashed; hence Geometric length. Additionally, each entry in each bank includes a tag that is compared with tag bits of the program counter to determine whether a hit occurred in the bank; hence TAgged.

As the papers describe, the TAGE predictors designed by Seznec have been entered in various branch prediction contests with significant success. The contests are based on software simulation of the branch predictors. The TAGE papers describe various ways the banks are updated in a probabilistic fashion.

BRIEF DESCRIPTION OF THE DRAWINGS

FIG. 1 is a block diagram illustrating a multi-bank conditional branch instruction predictor.

FIG. 2 is a block diagram of an entry of a memory bank of FIG. 1.

FIG. 3 is a flowchart illustrating operation of the branch predictor of FIG. 1.

FIG. 4 is a block diagram illustrating a multi-bank conditional branch instruction predictor according to an alternate embodiment.

DETAILED DESCRIPTION OF THE EMBODIMENTS

Figure 5:
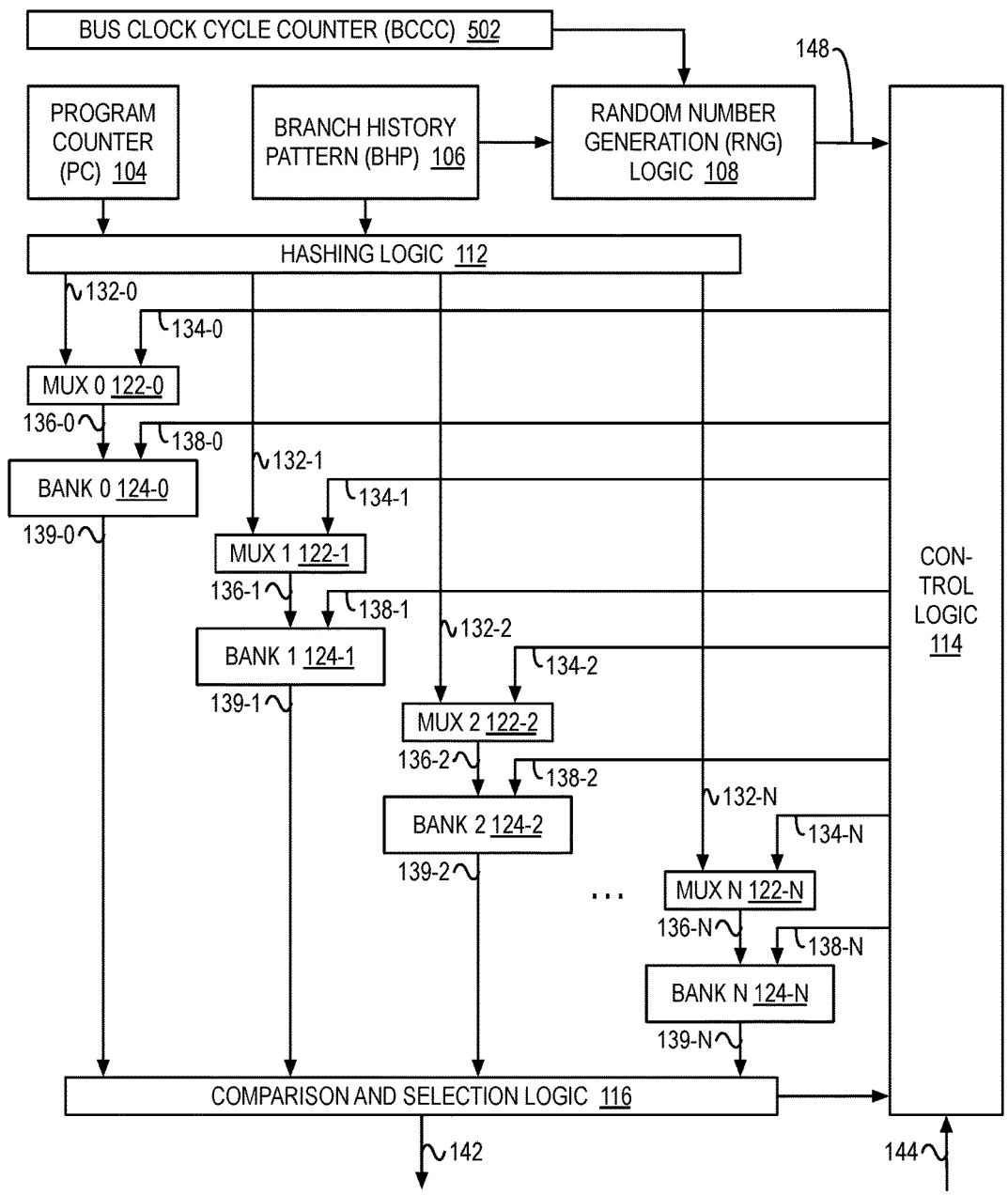
FIG. 5 is a block diagram illustrating a multi-bank conditional branch instruction predictor according to an alternate embodiment.

Referring now to FIG. 1, a block diagram illustrating a multi-bank conditional branch instruction predictor 100, or branch predictor 100, is shown. The branch predictor 100 is included in a processor for predicting the direction of conditional branch instructions that may be present in a block of instruction bytes fetched from an instruction cache of the processor. In one embodiment, the branch predictor 100 is an improvement on a conventional TAGE predictor. However, the embodiments are not limited to a TAGE predictor, and the embodiments may include other multi-bank predictors that utilize random numbers to make decisions related to updating the banks.

The branch predictor 100 includes an instruction counter 102, a program counter (PC) 104, a branch history pattern (BHP) 106, random number generation (RNG) logic 108, hashing logic, control logic 114, comparison logic 116, and a plurality of pairs of muxes 122 and memory banks 124. FIG. 1 illustrates four pairs of muxes 122 and banks 124 denoted mux 0 122-0 and bank 0 124-0, mux 1 122-1 and bank 1 124-1, mux 2 122-2 and bank 2 124-2, and mux N 122-N and bank N 124-N. The number of banks 124 may vary in different embodiments. Each mux 122 receives two respective inputs 132 and 134 and generates a respective output 136. Each bank 124 receives on its index input the output 136 of its respective mux 122 as well as a respective entry update 138 from the control logic 114 and provides a selected entry (e.g., 200 of FIG. 2) on its respective output 139 to the comparison and selection logic 116. Preferably, the PC 104 is the architectural program counter, or instruction pointer, of the processor that specifies an address at which a block of instruction bytes is fetched from the instruction cache.

The RNG logic 108 receives the instruction counter 102 and the branch history pattern 106 and performs one or more arithmetic and/or logical operations on selected bits of one or both of them to generate one or more random numbers 148 provided to the control logic 114. The control logic 114 uses the random numbers 148 to make decisions about updating the memory banks 124, as described in more detail herein. The RNG logic 108 comprises combinatorial logic that performs the arithmetic and/or logical operations on the selected bits of the one or both of the instruction counter 102 and branch history pattern 106. Examples of the arithmetic and/or logical operations include, but are not limited to: selection of predetermined bits of an entity; Boolean logical operations including exclusive-OR (XOR), NAND, AND, OR, NOT, rotate, shift; and arithmetic operations including addition, subtraction, multiplication, division, modulo.

The instruction counter 102 is a counter that counts instruction events. Preferably, the instruction counter 102 increments each clock cycle by the number of architectural instructions retired by the processor during the clock cycle. Alternatively, the instruction counter 102 increments each clock cycle by the number of microinstructions retired by the processor during the clock cycle. Furthermore, alternate embodiments are described below with respect to FIGS. 4 and 5 in which bits of a count of different events than instruction events are provided to the RNG logic 108 for use in generating the random numbers 148. The instruction counter 102 bits are denoted IC[x:y] in FIG. 1, where [x:y] signifies a range of bits of the instruction counter 102. In one embodiment, the RNG logic 108 generates a random number 148 by performing a Boolean exclusive-OR (XOR) operation on bits IC[15:8] with bits IC[7:0] to generate an 8-bit result, which is denoted RANDOM1 in FIG. 1 as shown.

The branch history pattern 106, also referred to by other terms such as the global history register (GHR), is an N-bit shift register. As the processor sees a conditional branch instruction, the processor shifts into the shift register the direction of the conditional branch instruction, i.e., taken or not taken, which in one embodiment correspond to a binary one or zero, respectively. Thus, the branch history pattern 106 keeps track of the direction history of the last N conditional branches seen by the processor. In one embodiment, a conditional branch instruction is seen if it is retired; alternatively, a conditional branch instruction is seen if the processor predicts it is present in the block of instruction bytes fetched from the instruction cache and is at a location with the block at the current PC 104 value or after, but not after a conditional branch predicted as taken. In one embodiment, N is approximately 100 bits. The branch history pattern 106 bits are denoted BHP[x:y] in FIG. 1, where [x:y] signifies a range of bits of the branch history pattern 106. In one embodiment, the RNG logic 108 generates a random number 148 by performing a Boolean exclusive-OR (XOR) operation on bits IC[15:8] with bits IC[7:0] with bits BHP [msb:msb-7] to generate an 8-bit result, which is denoted RANDOM2 in FIG. 1 as shown, where msb refers to the most significant bit of the branch history pattern 106.

Although embodiments have been described in which the random numbers 148 generated by the RNG logic 108 are 8 bits, other embodiments are contemplated in which the size of the random numbers 148 is different and different bits of the instruction counter 102 and/or branch history pattern 106 are used. For example, in one embodiment the random numbers 148 are 10 bits, e.g., RANDOM1=IC[19:10]^IC[9:0] and RANDOM2=IC[19:10]^IC[9:0]^BHP[MSB:MSB-9]. It should also be understood that other bits of the instruction counter 102 and/or branch history pattern 106 may be used than of the embodiments described here, e.g., RANDOM1=IC[22:13]^IC[9:0] and RANDOM2=IC[30:21]^IC[13:4]^BHP[40:31].

The branch predictor 100 makes decisions about whether and how to update the memory banks 124 using random numbers 148 generated by the RNG logic 108. Advantageously, the RNG logic 108 embodiments described herein generate the random numbers 148 in a very efficient manner. Furthermore, the RNG logic 108 embodiments may be more accurately simulated using software simulation tools than a simulation methodology that invokes a random number generator provided the software simulation tools (e.g., function random( ) in Verilog), which may enable more accurate performance modeling of the branch predictor 100.

The hashing logic 112 hashes a portion of the program counter 104 with a portion of the branch history pattern 106 to generate a respective index 132 for each of the banks 124. The respective indexes 132 are denoted 132-0, 132-1, 132-2 and 132-N in FIG. 1 and are provided as a first input to mux 0 122-0, mux 1 122-1, mux 2 122-2 through mux N 122-N, respectively. In one embodiment, as performed by a TAGE predictor, the hashing logic 112 simply passes through the portion of the program counter 104 as index 132-0 rather than hashing it with the branch history pattern 106, and the hashing logic 112 hashes a different length of the branch history pattern 106 with the program counter 104 to generate each of the remaining indexes 132-1, 132-2 through 132-N. In one embodiment, the hashing logic 112 performs an XOR of lower bits of the program counter 104 with the respective selected length of bits of the branch history pattern 106 to generate the indexes 132-1, 132-2 through 132-N.

Each of the muxes 122 also receives on a second input a respective update index 134 from the control logic 114. The control logic 114 controls each of the muxes 122 to select either the index 132 generated by the hashing logic 112 or the updated index 134 generated by the control logic 114 to provide on its respective output 136 to the index input of the respective bank 124. When the control logic 114 wants to update a bank 124, the control logic 114 generates a value on the bank's 124 respective update index 134 to select the entry to update and controls the respective mux 122 to select the update index 134 and controls the bank 124 to write an update value 138 generated by the control logic 114. When the control logic 114 wants to read an entry from a bank 124, the control logic 114 controls the respective mux 122 to select the index 132 and in response the bank 124 provides the selected entry on its output 139 to the comparison and selection logic 116.

Referring briefly to FIG. 2, a block diagram of an entry 200 of a bank 124 of FIG. 1 is shown. Preferably, each entry 200 in each of the banks 124 includes a valid bit 202, a tag 206, a prediction 204, and a useful indicator 208. The valid bit 202 indicates whether or not the entry is valid. The tag 206 is upper bits of the address (i.e., program counter value) of the corresponding conditional branch instruction. The prediction 204 indicates whether the conditional branch instruction will be taken or not taken. Preferably, the entry 200 comprises a counter (e.g., 3-bit saturating counter), and the prediction 204 is the most significant bit of the counter. In one embodiment, the counter is incremented when the conditional branch instruction is taken and decremented when the not taken. In another embodiment, the counter is updated according to a state machine based on whether the prediction 204 provided by the entry was a correct prediction or a misprediction. The useful indicator 208 is an indication of whether or not the entry 200 has been useful in predicting the conditional branch instruction. In one embodiment, the useful indicator 208 is used by the branch predictor 100 to make decisions about whether or not to allocate the entry 200 as described in more detail below. In one embodiment, the useful indicator 208 comprises a single bit; alternatively, the useful indicator 208 comprises a multi-bit counter whose count indicates a degree of usefulness of the entry 200.

Referring again to FIG. 1, when the branch predictor 100 is making a prediction, each bank 124 provides its respective selected entry 200 to the comparison and selection logic 116. Preferably, the comparison and selection logic 116 selects as the final prediction 142 the prediction provided by the entry 200 from the highest bank 124 having a valid tag 206 that matches the tag portion of the program counter 104. The highest bank 124 is the bank 124 whose index 132 has the longest branch history pattern 106 length used by the hashing logic 112. In one embodiment, the tag 206 stored in the entry is the upper bits of the address of the conditional branch instruction hashed with the branch history pattern 106, and the tag portion of the program counter 104 is hashed with the branch history pattern 106, and the two are compared by the comparison and selection logic 116. The comparison and selection logic 116 provides an indication to the control logic 114 of which of the banks 124 was selected as the final prediction 142.

The control logic 114 also receives, from an execution unit of the processor that executes conditional branch instructions, information 144 regarding each executed conditional branch instruction, such as the correct direction of the conditional branch instruction and its address. The control logic 114 maintains information about each predicted conditional branch instruction until it determines that the conditional branch instruction was executed or flushed from the processor pipeline. The control logic 114 uses the information maintained about each predicted conditional branch instruction and the information 144 received from the execution unit to enable it to make decisions about updating the memory banks 124 using the random numbers 148 generated using the instruction counter 102 and/or branch history pattern 106, as described in more detail below. In one embodiment, the processor includes a branch order table (BOT) that stores relevant information (including addresses) about in flight branch instructions and operates similarly to a reorder buffer (ROB).

Preferably, the processor that includes the branch predictor 100 includes a fetch unit, an instruction cache, a branch target address cache, an instruction translator, and an execution pipeline. In one embodiment, the execution pipeline is a superscalar out-of-order execution pipeline that includes one or more architectural register files, a register renaming unit, a reorder buffer, reservation stations, a plurality of execution units, and an instruction scheduler for scheduling the issue of microinstructions to the execution units. The execution units may include one or more of the following execution unit types: integer unit, floating-point unit, media unit, single-instruction-multiple-data (SIMD) unit, branch execution unit, load unit, and store unit. Preferably, the processor also includes a memory subsystem that includes a memory order buffer, translation-lookaside buffers, a tablewalk engine, a cache memory hierarchy, and various request queues, e.g., one or more load queues, store queues, fill queues, and/or snoop queues. Preferably, the fetch unit generates a block address, based on the program counter value, which is provided to the instruction cache and the branch target address cache. The instruction cache provides a block of architectural instruction bytes in response to the block address that may include one or more architectural branch instructions. Preferably, the instruction byte block is received by an instruction translator that translates the architectural instructions into microinstructions that are provided to the execution pipeline for execution.

Referring now to FIG. 3, a flowchart illustrating operation of the branch predictor 100 of FIG. 1 is shown. Flow begins at block 302.

At block 302, a block of instruction bytes is fetched from the instruction cache of the processor that is predicted to include at least one conditional branch instruction. Preferably, the branch target address cache predicts the presence of the conditional branch instruction by looking up the value of the program counter 104 in FIG. 1. Additionally, the hashing logic 112 hashes the program counter 104 value with various lengths of the branch history pattern 106 to generate the indexes 132 to apply to the banks 124 of FIG. 1. The selected entries 139 are provided to the comparison and selection logic 116 which selects a final prediction 142 that is provided to the execution pipeline of the processor. In particular, the branch predictor 100 selects as the final prediction 142 the prediction 204 from the entry of one of the banks 124. The bank 124 whose entry is selected is referred to in FIG. 3 as bank X. As described above, preferably the comparison and selection logic 116 selects the entry of the highest bank 124 having a valid tag that matches the tag portion of the program counter 104, where the highest bank 124 is the bank 124 whose index 132 has the longest branch history pattern 106 length used by the hashing logic 112. Preferably, the final prediction 142 is also provided to the execution pipeline of the processor so that the execution unit that executes the conditional branch instruction can compare the prediction to the resolved correct direction of the conditional branch instruction and provide an information 144 to the branch predictor 100 about whether or not the prediction 142 was correct. The branch predictor 100 uses the information 144 to update the banks 124. Flow proceeds to block 304.

At block 304, the execution unit executes the conditional branch instruction to resolve its correct direction, i.e., taken or not taken, and provides the branch predictor 100 with the correct direction 144. Flow proceeds to block 306.

At block 306, the control logic 114 determines that it needs to update one or more of the banks 124, so the RNG logic 108 generates random numbers 148 of FIG. 1 using instruction counter 102. As described above, the RNG logic 108 may also generate the random numbers 148 using both the instruction counter 102 and the branch history pattern 106. Flow proceeds to decision block 308.

At decision block 308, the control logic 114 determines whether or not the direction predicted by the branch predictor 100 matches the correct prediction 144 provided by the execution unit at block 304. If so, flow proceeds to decision block 312; otherwise, flow proceeds to decision block 316.

At decision block 312, the control logic 114 examines the random number 148 generated by the RNG logic 108. If the random number 148 is in the range of values 8-255, flow proceeds to block 314; whereas, if the random number 148 is in the range 0-7, flow proceeds to decision block 316. In this manner, the control logic 114 effectively decides whether or not to allocate a new entry according to a ratio of 1:31 when the predicted direction mismatches the correct direction. Advantageously, the RNG logic 108 of FIG. 1 provides the random number 148 in an efficient fashion and by comprising easily simulated combinatorial logic provides a more accurate ability to measure the performance gains afforded by the quality of the random numbers 148 provided by the RNG logic 108 rather than by the quality of the random numbers that would be provided by a random number generation function of the simulation tools, as described above.

At block 314, the branch predictor 100 does not allocate a new entry in the banks 124, and flow ends at block 314.

At decision block 316, the control logic 114 examines the random number 148 generated by the RNG logic 108. If the random number 148 is in the range of values 0-63, flow proceeds to block 318; whereas, if the random number 148 is in the range 64-255, flow proceeds to block 322. In this manner, the control logic 114 effectively decides whether to start looking for a bank 124 from which to allocate at bank X+1 or bank X+2 according to a ratio of 3:1. In one embodiment, the random number 148 examined at decision block 316 is a second random number 148, i.e., different than the random number 148 examined at decision block 308. It should be understood that the ratios used by the branch predictor 100 based on the random numbers 148, e.g., at decision blocks 312, 316 and 324, are described as examples, and other embodiments are contemplated that use other ratios. Additionally, it should be understood that although embodiments are described in which the random numbers 148 generated and used are 8 bits, other embodiments are contemplated in which different size random numbers 148 are generated and used.

At block 318, the control logic 114 starts at bank X+2 to find the first two banks 124 whose useful indicator 208 has a value of zero. For example, if bank X is bank 1 124-1 (i.e., the bank 124 that made the prediction as determined at block 302), then bank X+2 is bank 3 124-3. The branch predictor 100 may not be able to find two banks 124 that have zero useful indicators 208, or even one bank 124 that has a zero-valued useful indicator 208. Furthermore, the branch predictor 100 may need only one bank 124 that has a zero-valued useful indicator 208, e.g., if flow proceeds to block 328. Flow proceeds to decision block 324.

At block 322, the control logic 114 starts at bank X+1 to find the first two banks 124 whose useful indicators 208 have a value of zero. For example, if bank X is bank 1 124-1 (i.e., the bank 124 that made the prediction as determined at block 302), then bank X+1 is bank 2 124-2. Flow proceeds to decision block 324.

At decision block 324, the control logic 114 examines the random number 148 generated by the RNG logic 108. If the random number 148 is in the range of values 0-15, flow proceeds to block 326; whereas, if the random number 148 is in the range 16-255, flow proceeds to block 328. In this manner, the control logic 114 effectively decides whether to in one bank 124 or in two banks 124 according to a ratio of 15:1. In one embodiment, the random number 148 examined at decision block 324 is a third random number 148, i.e., different than the random numbers 148 examined at decision blocks 308 and 316.

At block 326, the control logic 114 allocates a new entry for the conditional branch instruction in both of the two banks 124 found at block 318/322. Flow ends at block 326.

At block 328, the control logic 114 allocates a new entry for the conditional branch instruction in only the shortest (i.e., using the shorter branch predictor 100 length) of the two banks 124 found at block 318/322 to bank X. Flow ends at block 328.

Referring now to FIG. 4, a block diagram illustrating a multi-bank conditional branch instruction predictor 100 according to an alternate embodiment is shown. The branch predictor 100 of FIG. 4 is similar in many respects to the branch predictor 100 of FIG. 1 and like-numbered elements are similar. However, the branch predictor 100 of FIG. 4 replaces the instruction counter 102 of FIG. 1 with a core clock cycle counter (CCCC) 402. The CCCC 402 counts the number of clock cycles of a processing core of the processor, preferably since reset of the core. The CCCC 402 is provided to the RNG logic 108 which uses it to generate the random numbers 148 provided to the control logic 114 which uses them to make decisions about updating the memory banks 124. Accordingly, the RANDOM1 and RANDOM2 equations shown in FIG. 4 are updated as RANDOM1=CCCC[19:10]^CCCC[9:0] and RANDOM2=CCCC[19:10]^CCCC[9:0]^BHP[MSB:MSB-9] to illustrate the use of the CCCC 402 rather than the instruction counter 102. The operation of the branch predictor 100 of FIG. 4 is similar to that described with respect to FIG. 3; however, at block 306 the RNG logic 108 uses the CCCC 402 rather than the instruction counter 102 bits to generate the random numbers 148.

Referring now to FIG. 5, a block diagram illustrating a multi-bank conditional branch instruction predictor 100 according to an alternate embodiment is shown. The branch predictor 100 of FIG. 5 is similar in many respects to the branch predictor 100 of FIG. 1 and like-numbered elements are similar. However, the branch predictor 100 of FIG. 5 replaces the instruction counter 102 of FIG. 1 with a bus clock cycle counter (BCCC) 502. The BCCC 502 counts the number of clock cycles of a bus external to the processor, preferably since reset of the processor. For example, the bus clock may be a system bus that couples the processor with peripherals and/or memory of the system. The BCCC 502 is provided to the RNG logic 108 which uses it to generate the random numbers 148 provided to the control logic 114 which uses them to make decisions about updating the memory banks 124. Accordingly, the RANDOM1 and RANDOM2 equations shown in FIG. 5 are updated as RANDOM1=BCCC[19:10]^BCCC[9:0] and RANDOM2=BCCC[19:10]^BCCC[9:0]^BHP[MSB:MSB-9] to illustrate the use of the BCCC 502 rather than the instruction counter 102. The operation of the branch predictor 100 of FIG. 5 is similar to that described with respect to FIG. 3; however, at block 306 the RNG logic 108 uses the BCCC 502 rather than the instruction counter 102 bits to generate the random numbers 148.

Figure 6:
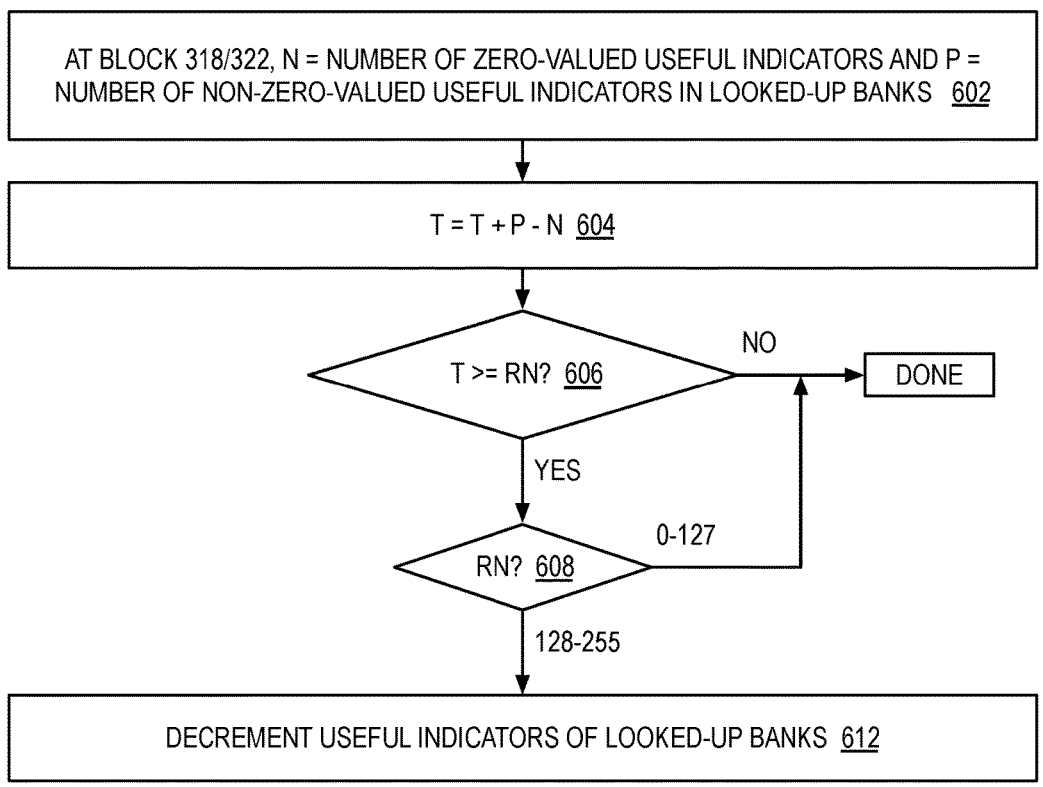
FIG. 6 is a flowchart illustrating operation of a branch predictor to make a decision about updating useful indicators.

Referring now to FIG. 6, a flowchart illustrating operation of the branch predictor 100 of FIG. 1 to make a decision about updating useful indicators 208 is shown. In one embodiment, each time the branch predictor 100 selects a bank 124 to make a prediction 142 (denoted bank X in FIG. 3), the branch predictor 100 also remembers an alternate prediction bank 124, referred to herein as bank Y. Bank Y is the bank 124 that would have been used to make the prediction 142 if there had been a miss in bank X. That is, bank Y is the next-lowest bank 124 in which the tag portion of the program counter 104 also hit, and if there was no lower bank 124 in which there was a hit then bank Y is the default bank 124, e.g., bank 0. Preferably, whenever bank X correctly predicts the direction of a conditional branch instruction and bank Y incorrectly predicts, then the control logic 114 increments the useful indicator 208. As described with respect to FIG. 3, the useful indictor 208 is used to allocate entries in the banks 124. However, if the useful indictors 208 are only ever incremented and never decremented, then eventually there will be no zero-valued useful indictors 208, which will negatively impact the allocation scheme. So, as described in the TAGE papers of Seznec, there is a need to age the useful indictors 208 to reset them to zero. Section 2.2 of the paper published in May 20, 2011 entitled A 64 Kbytes ISL-TAGE branch predictor by Andre Seznec describes the use of an 8-bit counter, referred to as TICK, used to dynamically monitor the number of successes and failures when trying to allocate a new entry after a misprediction. The TICK counter saturates when more failures than successes are encountered on allocations and at that time Seznec's predictor resets all the useful bits of the predictor. FIG. 6 describes a variation on the Seznec scheme. Preferably, the control logic 114 of the branch predictor 100 of FIG. 1 also includes a counter (not shown) referred to herein as T. Use of T in conjunction with the random numbers 148 generated by the RNG logic 108 based on the instruction counter 102 (or CCCC 402 or BCCC 502) and/or the branch history pattern 106 is described with respect to FIG. 6. Flow begins at block 602.

At block 602, in conjunction with the operations performed at block 318 or block 322, the control logic 114 determines two values, N and P. N is the number of useful indictors 208 from the banks 124 looked-up (i.e., searched) at block 318/322 that have a zero-valued useful indictor 208, and P is the number of non-zero-valued useful indictors 208 from the looked-up banks 124. Flow proceeds to block 604.

At block 604, the control logic 114 increments the value of T by P and decrements the value of T by N. In one embodiment, T is a 10-bit counter and thus has a range of 0-1023 and that is initialized to zero upon reset of the processor. Flow proceeds to decision block 606.

At decision block 606, the control logic 114 determines whether the value of T is greater than or equal to the value of a random number 148. If not, flow ends; otherwise, flow proceeds to decision block 608. In one embodiment, the random number 148 compared at decision block 606 is a 7-bit random number 148 and thus has a range of 0-127.

At decision block 608, the control logic 114 examines a random number 148 generated by the RNG logic 108. If the random number 148 is in the range of values 0-127, flow ends; whereas, if the random number 148 is in the range 128-255, flow proceeds to block 612. In this manner, the control logic 114 effectively decides whether to decrement the useful indictors 208 according to a 1:1 ratio. In one embodiment, the random number 148 examined at decision block 608 is a second random number 148, i.e., different than the random number 148 examined at decision block 606. It should be understood that the ratio used by the branch predictor 100 based on the random numbers 148, e.g., at decision block 608, is described as an example, and other embodiments are contemplated that use other ratios. Additionally, it should be understood that although embodiments are described in which the random numbers 148 generated and used at blocks 606 and 608 are 7 bits and 8 bits, respectively, other embodiments are contemplated in which different size random numbers 148 are generated and used.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line or other communications medium. Embodiments of the apparatus and method described herein may be included in a semiconductor intellectual property core, such as a processor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a processor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A branch predictor, comprising:
a plurality of memory banks having entries that hold prediction information for predicting a direction of branch instructions fetched and executed by a processor that comprises the branch predictor;
a counter of events that occur in the processor; hardware logic which is configured for performing an arithmetic and/or logical operation on predetermined bits of the counter to generate a random value; and wherein
in response to the processor determining the direction of a branch instruction predicted by the branch predictor, the branch predictor is configured for using the random value generated by the hardware logic to make a decision about updating the memory banks;
a branch history pattern that specifies a history of directions of branch instructions encountered by the processor; and wherein the hardware logic, in addition to performing the arithmetic or logical operation on predetermined bits of the count, performs the arithmetic and/or logical operation also on predetermined bits of the branch history pattern to generate the random value;
wherein the arithmetic or logical operation comprises a Boolean exclusive-OR (XOR) operation of a first portion of bits of the count with a second portion of bits of the count;
wherein the event counted comprises a retire of an instruction by the processor.

2. The branch predictor of claim 1, further comprising:
wherein the event counted comprises a cycle of a clock of an external bus to which the processor is coupled.

3. The branch predictor of claim 1, further comprising:
wherein the event counted comprises a cycle of a core clock of the processor.

4. The branch predictor of claim 1, further comprising:
wherein the random value is from a set of possible values;
wherein when the direction predicted by the branch predictor matches the correct direction, the branch predictor is configured to allocate, a new entry in one or more of the plurality of memory banks if the random value is one of a predetermined subset of the set of possible values and otherwise does not to allocate a new entry in one or more of the plurality of memory banks.

5. The branch predictor of claim 1, further comprising:
wherein the random value is from a set of possible values;
wherein when the direction predicted by the branch predictor does not match the correct direction, the branch predictor is configured to allocate a new entry in more than one of the plurality of memory banks if the random value is one of a predetermined subset of the set of possible values and otherwise to allocate a new entry in one of the plurality of memory banks.

6. The branch predictor of claim 1, further comprising:
wherein the random value is from a set of possible values;
wherein each bank of the plurality of memory banks is configured to receive an index computed using a different length of a branch history pattern, and each bank of the plurality of memory banks has a number, and the bank numbers increase sequentially from shortest length to longest length; and
wherein each entry in the plurality of memory banks includes an indicator that indicates whether the entry has tended to be useful in predicting the direction of branch instructions;
wherein when allocating an entry in the plurality of banks in response to the processor determining the correct direction of a branch instruction having a direction was predicted by a first bank of the plurality of memory banks having a bank number X, the branch predictor begins searching for a non-useful entry to allocate at bank numbered X+1 if the random value is one of a predetermined subset of the set of possible values and otherwise begins searching for a non-useful entry to allocate at bank numbered X+2.

7. The branch predictor of claim 1, further comprising:
wherein each entry in the plurality of memory banks includes an indicator that indicates whether the entry has tended to be useful in predicting the direction of branch instructions; a counter incremented by a number of banks whose indicator indicates its entry has tended to be useful and decremented by a number of banks whose indicator indicates its entry has tended not to be useful; and wherein the branch predictor probabilistically decrements the indicators when the counter has a value greater than or equal to the random value.

8. A method of operating a branch predictor that has a plurality of memory banks having entries that hold prediction information used to predict a direction of branch instructions fetched and executed by a processor that comprises the branch predictor, the method comprising:

maintaining a count of events that occur in the processor;

performing an arithmetic and/or logical operation on predetermined bits of the count to generate a random value; and in response to the processor determining the direction of a branch instruction predicted by the branch predictor, using the generated random value to make a decision about updating the memory banks;

maintaining a branch history pattern that specifies a history of directions of branch instructions encountered by the processor; and in addition to performing the arithmetic or logical operation on predetermined bits of the count, performing the arithmetic or logical operation also on predetermined bits of the branch history pattern to generate the random value;

wherein the arithmetic and/or logical operation comprises a Boolean exclusive-OR (XOR) operation of a first portion of bits of the count with a second portion of bits of the count;

wherein the event counted comprises a retire of an instruction by the processor.

9. The method of claim 8, further comprising: wherein the event counted comprises a cycle of a clock of an external bus to which the processor is coupled.

10. The method of claim 8, further comprising: wherein the event counted comprises a cycle of a core clock of the processor.

11. The method of claim 8, further comprising: wherein the random value is from a set of possible values; when the direction predicted by the branch predictor matches the correct direction, allocating a new entry in one or more of the plurality of memory banks if the random value is one of a predetermined subset of the set of possible values and otherwise not allocating a new entry in one or more of the plurality of memory banks.

12. The method of claim 8, further comprising:

wherein the random value is from a set of possible values; when the direction predicted by the branch predictor does not match the correct direction, allocating a new entry in more than one of the plurality of memory banks if the random value is one of a predetermined subset of the set of possible values and otherwise allocating a new entry in one of the plurality of memory banks.

13. The method of claim 8, further comprising:

wherein the random value is from a set of possible values; wherein each bank of the plurality of memory banks receives an index computed using a different length of a branch history pattern, and each bank of the plurality of memory banks has a number, and the bank numbers increase sequentially from shortest length to longest length; and wherein each entry in the plurality of memory banks includes an indicator that indicates whether the entry has tended to be useful in predicting the direction of branch instructions; when allocating an entry in the plurality of banks in response to the processor determining the correct direction of a branch instruction whose direction was predicted by a first bank of the plurality of memory banks having a bank number X, beginning to search for a non-useful entry to allocate at bank numbered X+1 if the random value is one of a predetermined subset of the set of possible values and otherwise beginning to search for a non-useful entry to allocate at bank numbered X+2.

14. The method of claim 8, further comprising:

wherein each entry in the plurality of memory banks includes an indicator that indicates whether the entry has tended to be useful in predicting the direction of branch instructions;

incrementing a counter by a number of banks whose indicator indicates its entry has tended to be useful and decrementing the counter by a number of banks whose indicator indicates its entry has tended not to be useful; and probabilistically decrementing the indicators when the counter has a value greater than or equal to the random value.

15. A computer program product encoded in at least one non-transitory computer usable medium for use with a computing device, the computer program product comprising:

computer usable program code embodied in said medium, for specifying a branch predictor, the computer usable program code comprising:

first program code for specifying a plurality of memory banks having entries that hold prediction information used to predict a direction of branch instructions fetched and executed by a processor that comprises the branch predictor;

second program code for specifying a count of events that occur in the processor;

third program code for specifying hardware logic that performs an arithmetic and/or logical operation on predetermined bits of the count to generate a random value; and wherein in response to the processor determining a correct direction of a branch instruction predicted by the branch predictor, the branch predictor uses the random value generated by the hardware logic to make a decision about updating the memory banks;

a branch history pattern that specifies a history of directions of branch instructions encountered by the processor; and wherein the hardware logic, in addition to performing the arithmetic or logical operation on predetermined bits of the count, performs the arithmetic and/or logical operation also on predetermined bits of the branch history pattern to generate the random value;

wherein the arithmetic or logical operation comprises a Boolean exclusive-OR (XOR) operation of a first portion of bits of the count with a second portion of bits of the count;

wherein the event counted comprises a retire of an instruction by the processor.

* * * * *